(12) United States Patent
Baucom et al.

(10) Patent No.: US 11,187,862 B2
(45) Date of Patent: Nov. 30, 2021

(54) COUPLING SYSTEM FOR FIBER OPTIC CABLE USING RAISED TAPE

(71) Applicant: Corning Optical Communications LLC, Charlotte, NC (US)

(72) Inventors: James Lee Baucom, Conover, NC (US); Jason Clay Lail, Conover, NC (US); William Welch McCollough, Cramerton, NC (US); David Alan Seddon, Hickory, NC (US)

(73) Assignee: CORNING OPTICAL COMMUNICATIONS LLC, Charlotte, NC (US)

( * ) Notice: Subject to any disclaimer, the term of this patent is extended or adjusted under 35 U.S.C. 154(b) by 1493 days.

(21) Appl. No.: 13/852,825

(22) Filed: Mar. 28, 2013

(65) Prior Publication Data
US 2015/0268429 A1   Sep. 24, 2015

(51) Int. Cl.
*G02B 6/44* (2006.01)

(52) U.S. Cl.
CPC ........... *G02B 6/4403* (2013.01); *G02B 6/441* (2013.01); *G02B 6/4494* (2013.01); *Y10T 29/49908* (2015.01)

(58) Field of Classification Search
None
See application file for complete search history.

(56) References Cited

U.S. PATENT DOCUMENTS

| | | | | |
|---|---|---|---|---|
| 4,232,935 A | * | 11/1980 | Rohner | G02B 6/4405 174/102 D |
| 4,909,592 A | | 3/1990 | Arroyo et al. | |
| 5,006,670 A | | 4/1991 | Plant | |
| 5,133,034 A | * | 7/1992 | Arroyo | G02B 6/4415 174/23 C |
| 5,305,410 A | * | 4/1994 | Arroyo | G02B 6/447 385/100 |
| 5,630,003 A | | 5/1997 | Arroyo | |
| 5,906,952 A | * | 5/1999 | Everaere | D04H 1/10 428/219 |

(Continued)

FOREIGN PATENT DOCUMENTS

| | | |
|---|---|---|
| CN | 1912662 A | 2/2007 |
| EP | 1085357 | 3/2001 |

(Continued)

OTHER PUBLICATIONS

Norris, Richard H., et al., "The Validity of Emerging Test Techniques for the Evolving Outside Plant Cable Design," IWCS 2007, 6 pages.

(Continued)

*Primary Examiner* — Andrew Jordan
(74) *Attorney, Agent, or Firm* — William D. Doyle

(57) ABSTRACT

A fiber optic cable includes a tube, a stack of fiber optic ribbons twisting along a lengthwise axis through the tube, a support, and water-blocking tape positioned at least partially around the stack, between the stack and the tube. The support and water-blocking tape provide an elevated portion of the water-blocking tape that is raised. As the stack twists along the lengthwise axis of the tube, corners of the stack interface with the elevated portion to provide intermittent frictional coupling between the stack and the tube.

4 Claims, 3 Drawing Sheets

(56) References Cited

U.S. PATENT DOCUMENTS

| | | | |
|---|---|---|---|
| 6,052,502 A | 4/2000 | Coleman | |
| 6,160,939 A * | 12/2000 | Sheu | G02B 6/4433 385/100 |
| 6,236,790 B1 | 5/2001 | Okada et al. | |
| 6,278,826 B1 | 8/2001 | Sheu | |
| 6,594,427 B1 * | 7/2003 | Dixon | G02B 6/443 385/109 |
| 6,631,229 B1 | 10/2003 | Norris et al. | |
| 6,704,482 B2 | 3/2004 | Okada et al. | |
| 6,760,523 B2 | 7/2004 | V. Nechitailo | |
| 6,778,745 B2 * | 8/2004 | Debban, Jr. | G02B 6/4411 385/114 |
| 6,847,768 B2 * | 1/2005 | Lail | G02B 6/4405 385/100 |
| 6,876,798 B2 | 4/2005 | Triplett et al. | |
| 6,931,184 B2 | 8/2005 | Tedder et al. | |
| 6,970,629 B2 | 11/2005 | Lail et al. | |
| 7,515,795 B2 * | 4/2009 | Overton | G02B 6/4494 385/100 |
| 7,567,739 B2 * | 7/2009 | Overton | G02B 6/4494 385/100 |
| 7,599,589 B2 * | 10/2009 | Overton | G02B 6/4494 385/100 |
| 7,936,957 B1 | 5/2011 | Puzan et al. | |
| 8,145,022 B2 * | 3/2012 | Overton | G02B 6/4494 385/111 |
| 8,170,388 B2 | 5/2012 | Schrauwen et al. | |
| 8,195,018 B2 * | 6/2012 | Overton | G02B 6/4494 385/100 |
| 8,208,873 B2 | 6/2012 | Seidel et al. | |
| 8,229,263 B2 | 7/2012 | Parris et al. | |
| 8,369,668 B1 * | 2/2013 | McNutt | G02B 6/4479 385/109 |
| 8,676,011 B1 * | 3/2014 | McNutt | G02B 6/4479 385/109 |
| 8,682,123 B2 * | 3/2014 | Parris | G02B 6/4411 385/100 |
| 9,170,388 B2 | 10/2015 | Baucom et al. | |
| 9,581,777 B2 * | 2/2017 | Baucom | G02B 6/4403 |
| 2004/0047573 A1 * | 3/2004 | Lail | G02B 6/4405 385/111 |
| 2004/0091221 A1 * | 5/2004 | Debban, Jr. | G02B 6/4411 385/114 |
| 2004/0120666 A1 | 6/2004 | Chalk et al. | |
| 2004/0208462 A1 | 10/2004 | Parsons et al. | |
| 2004/0240808 A1 | 12/2004 | Rhoney et al. | |
| 2005/0180704 A1 | 8/2005 | Terry et al. | |
| 2005/0213921 A1 | 9/2005 | Mertesdorf et al. | |
| 2007/0019915 A1 * | 1/2007 | Overton | G02B 6/4494 385/100 |
| 2007/0269172 A1 | 11/2007 | Parsons et al. | |
| 2008/0145010 A1 * | 6/2008 | Overton | G02B 6/4494 385/115 |
| 2008/0181564 A1 * | 7/2008 | Overton | G02B 6/4494 385/109 |
| 2009/0003779 A1 | 1/2009 | Parris | |
| 2009/0279833 A1 * | 11/2009 | Overton | G02B 6/4494 385/111 |
| 2010/0303431 A1 | 12/2010 | Cox et al. | |
| 2011/0116753 A1 * | 5/2011 | Overton | G02B 6/4494 385/111 |
| 2011/0293230 A1 | 12/2011 | Wells et al. | |
| 2012/0014562 A1 | 1/2012 | Berkovich et al. | |
| 2012/0014652 A1 * | 1/2012 | Parris | G02B 6/4494 385/111 |
| 2012/0120389 A1 | 5/2012 | Logan et al. | |
| 2013/0084047 A1 * | 4/2013 | Baucom | G02B 6/44 385/114 |
| 2014/0199037 A1 * | 7/2014 | Hurley | G02B 6/4403 385/114 |
| 2014/0369656 A1 * | 12/2014 | Gimblet | G02B 6/02395 385/113 |
| 2015/0268428 A1 | 9/2015 | Baucom et al. | |
| 2015/0268429 A1 * | 9/2015 | Baucom | G02B 6/4403 385/114 |
| 2016/0018613 A1 | 1/2016 | Baucom et al. | |

FOREIGN PATENT DOCUMENTS

| | | |
|---|---|---|
| EP | 1746447 | 10/2011 |
| EP | 1746447 B1 | 10/2011 |
| JP | 11-258472 A | 9/1999 |
| WO | 2009/002448 A1 | 12/2008 |

OTHER PUBLICATIONS

Temple, Kenneth D., et al., "Update: Gel-Free Outside Plant Fiber-Optic Cable Performance Results in Special Testing," IWCS 2007, 6 pages.

Van Vickle, Patrick, et al., "Central Tube Cable Ribbon Coupling," IWCS 2008, 6 pages.

Norris, Richard H., et al., "Dry Central Tube Ribbon Cables for the Outside Plant Environment," Proceedings of the 51st IWCS, 2002, 9 pages.

Patent Cooperation Treaty International Search Report and Written Opinion for International Application No. PCT/US2012/057789; dated Dec. 21, 2012, 11 pages.

* cited by examiner

COUPLING SYSTEM FOR FIBER OPTIC CABLE USING RAISED TAPE

BACKGROUND

Aspects of the present disclosure relate generally to fiber optic cables, and more specifically to frictional coupling of optical elements within the fiber optic cables to surrounding structure of the cables.

Coupling of optical elements, such as stacks of ribbons of optical fibers, within fiber optic cables to surrounding structure of the cables minimizes axial displacement and subsequent buckling of the optical elements that may lead to increased optical fiber signal attenuation. For example, if optical elements are insufficiently coupled, the optical elements may become redistributed in a cable when the cable stretches or bends; and, as a result, the optical elements may become unevenly packed into a section of the cable. When the cable contracts in cooler temperatures or when tension is released, the optical elements in the packed section may then buckle or kink, leading to attenuation and/or fiber damage.

Foam and special foam tapes may be used in fiber optic cables to provide coupling between optical elements and the surrounding structure. However, the foam may be bulky and may correspondingly increase a cable diameter and associated material costs. A need exists for an efficient solution to couple optical elements within fiber optic cables to surrounding structure of the cables without increasing the cable diameter and associated material costs.

SUMMARY

One embodiment relates to a fiber optic cable, which includes a tube, a stack of fiber optic ribbons extending through the interior of the tube, a water-blocking tape positioned at least partially around the stack between the stack and the tube, and a support positioned between the water-blocking tape and the tube. The water-blocking tape at least partially overlays the support such that an elevated portion of the water-blocking tape is raised toward a lengthwise center of the interior of the tube. The stack twists along a lengthwise axis of the tube. As the stack twists, at a position along the length of the cable in which a first cross-sectional dimension of the stack is aligned with the elevated portion, the stack interfaces with the elevated portion to provide frictional coupling between the stack and the tube. At another position along the length of the cable in which a second cross-sectional dimension of the stack is aligned with the elevated portion, the stack has less frictional coupling with the tube. As such, the twisting of the stack in combination with the water-blocking tape overlaying the support provides intermittent or variable coupling of the stack and the tube Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE FIGURES

The accompanying Figures are included to provide a further understanding, and are incorporated in and constitute a part of this specification. The drawings illustrate one or more embodiments, and together with the Detailed Description serve to explain principles and operations of the various embodiments. As such, the disclosure will become more fully understood from the following Detailed Description, taken in conjunction with the accompanying Figures, in which.

DETAILED DESCRIPTION

Before turning to the Figures, which illustrate exemplary embodiments now described in detail, it should be understood that the present inventive technology is not limited to the details or methodology set forth in the Detailed Description or illustrated in the Figures. For example, as will be understood by those of ordinary skill in the art, features and attributes associated with embodiments shown in one of the Figures may be applied to embodiments shown in others of the Figures.

Subject matter disclosed herein is generally related to subject matter disclosed in U.S. application Ser. No. 13/625,052 filed Sep. 24, 2012, which is incorporated by reference herein in its entirety.

Figure 1:
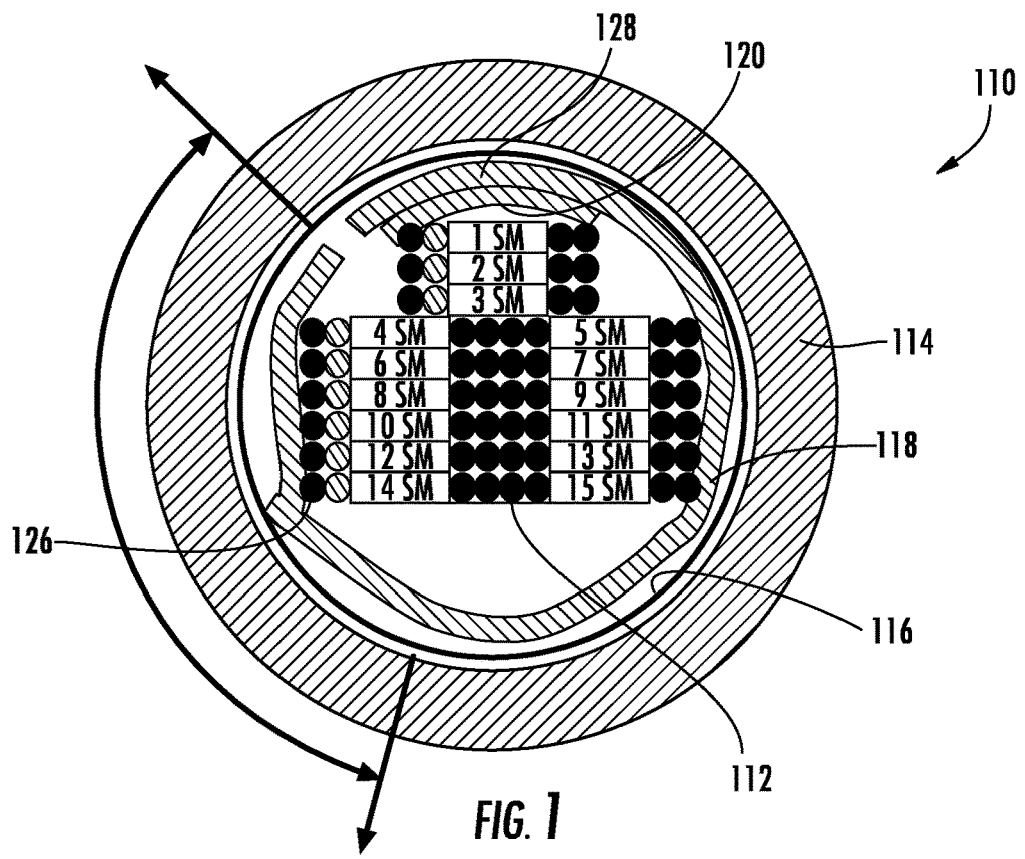
FIGS. 1-4 are cross-sectional views of fiber optic cables according to exemplary embodiments. As used herein with regard to an elongate body, such as a fiber optic cable or optical fiber, "cross-sectional" refers to the transverse cross-section, orthogonal to the length of the elongate body.

Referring to FIG. 1, a fiber optic cable 110 includes a tube 114 having an interior 116, an optical element, such as a stack of fiber optic ribbons 112, extending through the interior 116 of the tube 114, and tape 118 positioned at least partially around the stack of fiber optic ribbons 112 in the interior 116 of the tube 114, between the stack of fiber optic ribbons 112 and the tube 114. According to an exemplary embodiment, the stack of fiber optic ribbons 112 twists along a lengthwise axis of the tube 114, shown as the center of the stack 112 in FIG. 1.

While in FIG. 1 the optical element is shown as a stack of optical fiber ribbons 112, in other contemplated embodiments the optical element may include an arrangement of buffer tubes, which may be twisted ("stranded") around a central member, such as a steel or dielectric rod. The buffer tubes may include loose optical fibers, tight-buffered optical fibers, one or more ribbons of optical fibers, or other arrangements of optical fibers. In some embodiments, the optical elements may include tight-buffered optical fibers that are stranded around a central member. The exterior perimeter of such an assembly may be crenulated or undulating, similar to the perimeter of the ribbon stacks 112, 212, 312 in cross-section as shown in the FIGURES.

In some embodiments, the tape 118 is a water-blocking tape. In some embodiments, the tape 118 is formed from a non-woven material having a thickness of less than 1 mm, such as less than 0.5 mm. In some embodiments, the tape 118 includes super-absorbent polymer, such as powder, integrated with the tape 118. Prior to being wrapped around the stack of ribbons 112, the tape 118 may generally be a strip having a substantially constant width. In some embodiments, the interior of the tube 114 is round and the tape 118 has an average width that is greater than the interior perimeter of the tube 114, such as at least 120% thereof. In other embodiments, the average width of the tape is less than the interior perimeter of the tube 114.

In some embodiments, the tube 114 is a polymeric tube. The tube 114 may include polyethylene, polypropylene, polycarbonate, and/or other materials. In some embodiments, the tube is round and is less than a 1 cm in outer diameter. In other embodiments, the tube is non-round, such as a tube having an oblong exterior with a rectangular cavity defined therein. In some embodiments, the cable further includes a jacket surrounding the tube, such as a polymeric jacket, which may include polyethylene. In some embodiments, the cable may include an armor layer between the tube and the jacket. In some embodiments, the cable may include multiple tubes that are stranded around a central member and surrounded by the jacket. In other embodiments, the tube 114 is a jacket that is the exterior most portion of the cable 110, 210, 310.

Referring again to FIG. 1, the tape 118 is positioned at least partially around the stack of fiber optic ribbons 112 in the interior 116 of the tube 114, between the stack 112 and the tube 114. Further, the tape 118 is raised such that an elevated portion 120 of the tape 118 is raised toward a lengthwise center of the interior of the tube 114. In some embodiments, as shown in FIG. 1, the tape 118 is raised by a support, in the form of an additional piece of tape 128, such that the elevated portion 120 is has at least two layers of the tape 118, 128 that overlay one another. The layer of the elevated portion 120 closest to the center of the tube 114 is raised relative to surrounding portions of the tape 118.

Figure 2:
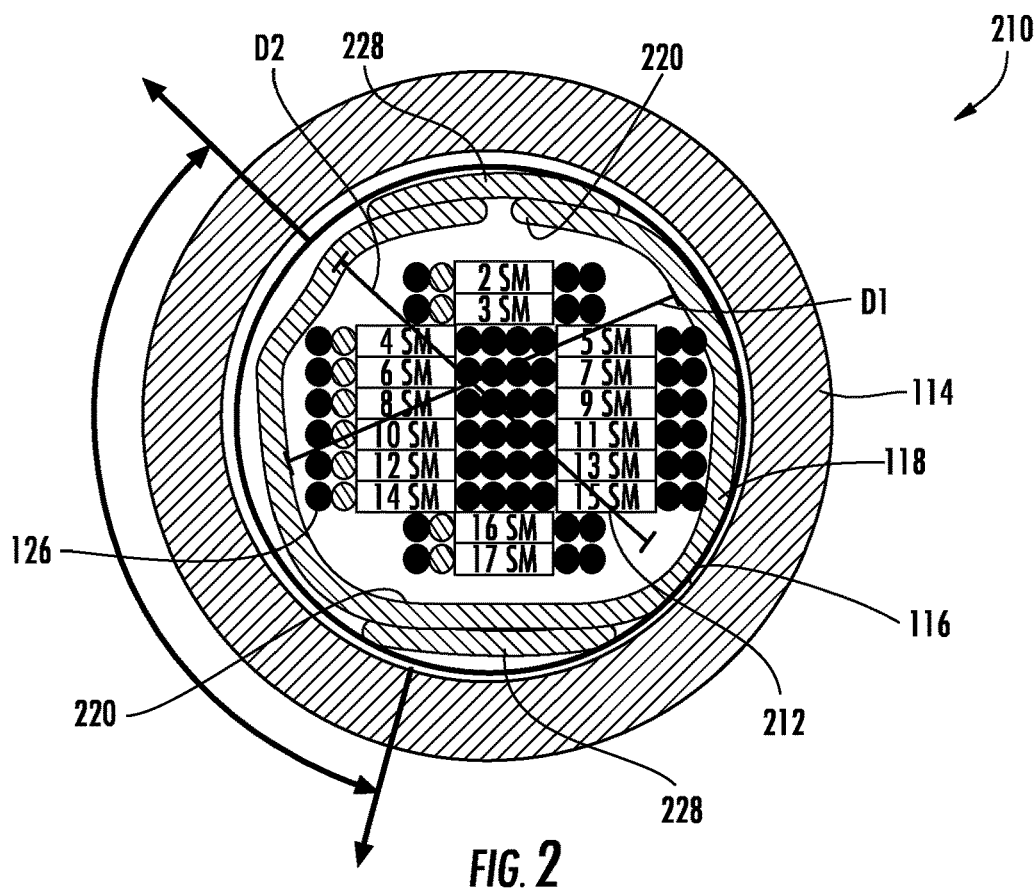

In other embodiments, as shown in FIG. 2, the elevated portion 220 of the tape 118 may be raised by supports on opposing sides of the interior 116 of the tube 114. The supports, in the form of an additional piece or pieces of tape 228, may be positioned on the inside or outside of the rest of the tape 118 to provide the elevated portion 220. In some embodiments, positioning the additional piece or pieces of tape 228 between the rest of the tape 118 and the tube 114 helps hold the additional piece of pieces of tape 228 in place, providing a straight, lengthwise elevated portion 220 or ridge along the interior 116 of the tube 114 for variable or intermittent coupling, as further explained below.

Figure 3:
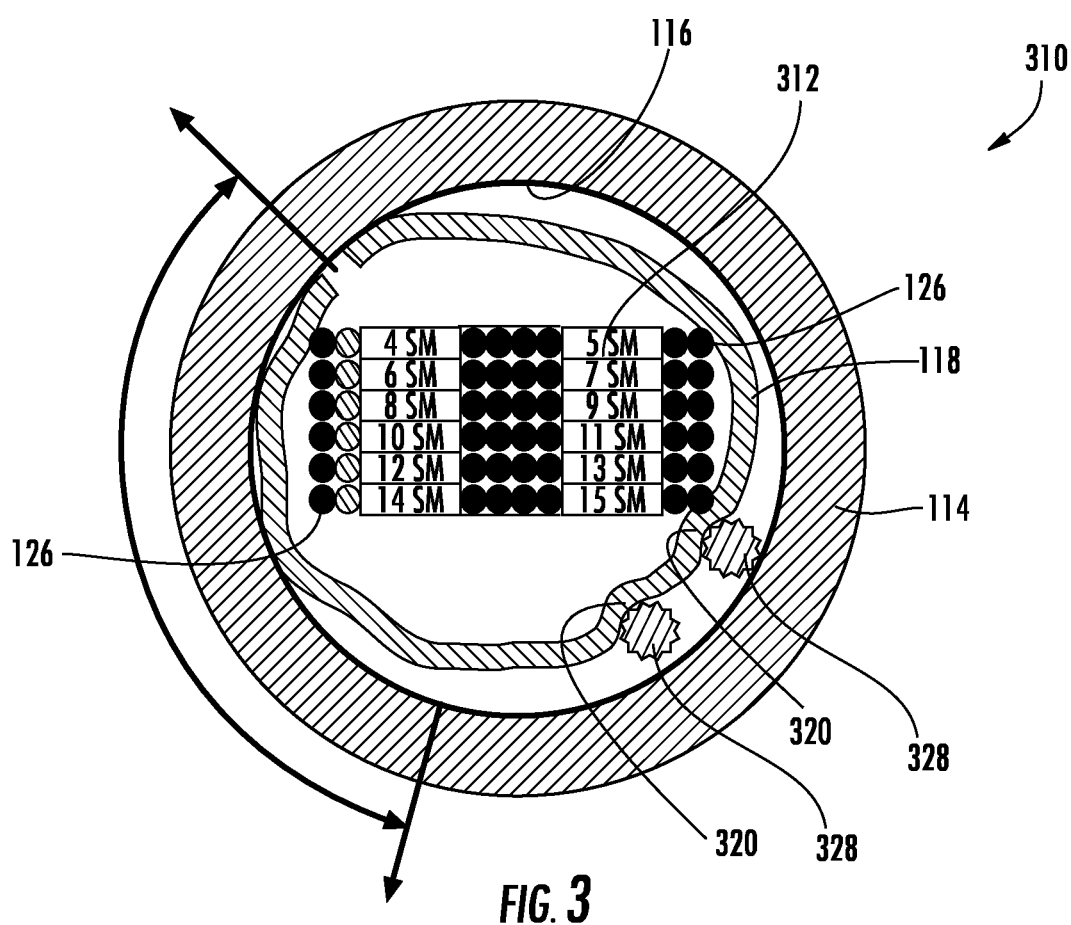

In still other embodiments, as shown in FIG. 3, the elevated portion 320 of the tape 118 may be raised by supports that are not additional tape. The supports, in the form of one or more pieces of yarn 328, such as water-blocking yarn and/or tensile yarn, may be positioned between the tape 118 and the tube 114 to provide the elevated portion 320. The pieces of yarn 328 may be positioned within a confined area or arc of the interior of the tube to provide a ridge or elevated portion 320 that allows for variable or intermittent coupling, as further explained below.

Figure 4:
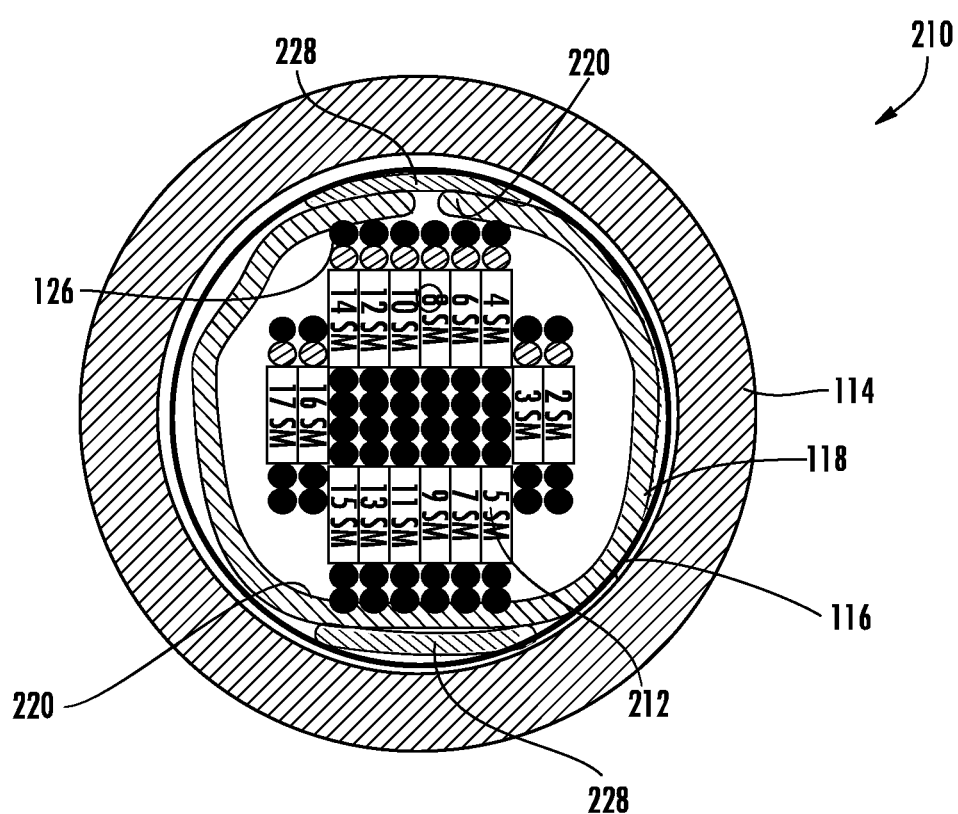

Referring again to FIGS. 1-4, wherein FIG. 4 illustrates a twisting of stack 112 at a cross-sectional view axially displaced from the view shown in FIG. 1, as the stack 112, 212, 312 twists along the lengthwise axis of the tube 114, at a position along the length of the cable 110, 210, 310 in which a first cross-sectional dimension of the stack 112 (see, e.g., first cross-sectional dimension $D_1$ as shown in FIG. 2) is aligned with the elevated portion 120, 220, 320 the stack 112 interfaces with the elevated portion 120, 220, 320 to provide frictional coupling between the stack 112, 212, 312 and the tube 114. In some embodiments, the first cross-sectional dimension is the widest cross-sectional dimension of the stack (or one of the widest).

As such, for a rectilinear- or polygonal-cross-section of the stack 112, 212, 312, the first cross-sectional dimension corresponds to a section of the stack 112, 212, 312 including corners 126.

At another position along the length of the cable 110, 210, 310 in which a second cross-sectional dimension of the stack 112, 212, 312 (see, e.g., second cross-sectional dimension $D_2$ as shown in FIG. 2) is aligned with the elevated portion 120, 220, 320 the stack 112 has less frictional coupling with the tube 114 than in the previous position, in which the first cross-sectional dimension of the stack 112, 212, 312 is aligned with the elevated portion 120, 220, 320. As such, for a rectilinear- or polygonal-cross-section of the stack 112, 212, 312, the second cross-sectional dimension corresponds to a section of the stack 112, 212, 312 between corners 126. In some embodiments, the stack 312 is rectangular in cross-section, having four corners 126. In other embodiments, the stack 112, 212 includes wider and narrower ribbons and is tiered, as shown in FIGS. 1-2, where the stack 112 has more than four corners 126, such as six (see FIG. 1), eight (see FIG. 2), twelve (three-tiered symmetric), or other numbers of corners 126.

The first cross-sectional dimension provides frictional coupling between the stack 112, 212, 312 and the tube 114 because the dimensions of the stack 112, 212, 312, the elevated portion 120, 220, 320, and interior 116 of the tube 114 are coordinated so that the stack 112 presses (e.g., loads, drives, compresses) the layer(s) of the elevated portion 120, 220, 320 together and/or against the interior 116 of the tube 114 as the first cross-sectional dimension $D_1$ twists past and interfaces with the elevated portion 120, 220, 320. By contrast, the second cross-sectional dimension provides less frictional coupling between the stack 112, 212, 312 and the tube 114 because the dimensions of the stack 112, 212, 312, the elevated portion 120, 220, 320, and interior 116 of the tube 114 are coordinated so that the stack 112, 212, 312 presses less or not at all on the elevated portion 120, 220, 320 as the second cross-sectional dimension twists past the elevated portion 120, 220, 320.

According to an exemplary embodiment, the support 128, 228, 328 raises the elevated portion 120, 220, 320 of the tape 118, 128, 228 at least 350 micrometers from the interior 116 of the tube 114 toward the center of the tube 114 when uncompressed by the ribbon stack 112, 212, 312, such as at least 500 micrometers from the interior 116 of the tube 114. In some such embodiments, interaction with the first cross-sectional dimension of the stack 112, 212, 312 compresses the elevated portion 120, 220, 320 to less than 300 micrometers from the interior 116 of the tube 114 toward the center of tube 114, such as less than 200 micrometers from the interior 116 of the tube 114.

Accordingly, the twisting of the stack 112, 212, 312 of fiber optic ribbons in combination with the raised tape 118, 128, 228 provides intermittent or variable coupling of the stack 112, 212, 312 and the tube 114. The intermittent or variable coupling helps to mitigate risks of buckling of the optical elements due to migration and changes in cable 110, 210, 310 strain. Further, the intermediate sections of lesser coupling facilitate localized movement of the ribbon stack 112, 212, 312 to low-stress positions as the cable 110, 210, 310 bends, which may improve bending performance of the optical fibers of the ribbons in the stack 112, 212, 312.

The length of the elevated portion 120, 220, 320 relative to the perimeter of the interior 116 of the tube 114 may influence the magnitude of frictional coupling between the stack 112, 212, 312 and the tube 114. In some embodiments, the interior 116 of the tube 114 is round and the elevated portion and/or portions 120, 220, 320 cover an arc of at least 15-degrees of the interior 116, such as an arc of at least 30-degrees of the interior 116. In some embodiments, frictional coupling of the first cross-sectional dimension $D_1$ to the interior 116 of the tube 114 by way of the elevated and/or portions 120, 220, 320 of the tape 118 is at least twice that of the second cross-sectional dimension, such as at least ten times that of the second cross-sectional dimension. The value of localized frictional coupling can be estimated using empirical data corresponding to the net frictional coupling and standard numerical modeling, such as finite element analysis.

In some such embodiments or in other embodiments, the interior 116 of the tube 114 is round and the elevated portion or portions 120, 220, 320 cover an arc of less than 90-degrees of the interior 116, such as less than 60-degrees. Limiting the size of the elevated portion or portions 120, 220, 320 to a dimension less that the distance between two corners 126 of the stack 112, 212, 312 allows for the intermittent sections of lesser coupling. However, in other contemplated embodiments, the interior 116 of the tube 114 is round and the elevated portion or portions 120, 220, 320 cover an arc of at least 90-degrees of the interior 116, where the stack 112, 212, 312 is continuously frictionally coupled to the tube 114 along the length of the cable 110, 210, 310.

In some such embodiments or in other embodiments, for a 30 meter length of the cable 110, 210, 310 the net force to pull the stack 112 from the tube 114 is at least 0.05 N per optical fiber in the stack 112, 212, 312, which is facilitated by the frictional coupling provided by the raised tape 118, 128, 228. In some such embodiments, the cable 110, 210 includes eight or more optical fibers, such as 72 optical fibers. In some embodiments, for a 30 meter length of the cable 110, 210, the net force to pull the stack 112, 212, 312 from the tube 114 is at least 0.1 N per optical fiber in the stack 112, 212, 312 and/or the net force to pull the stack 112, 212, 312 from the tube 114 is less than 1.0 N per optical fiber in the stack 112, 212, 312. The net force is measured via load cell as a 30 m length of the cable 110, 210, 310 is laid straight and constrained on a flat level surface and the stack 112, 212, 312 is drawn forward out of the tube 114 at a rate of about 1 m/min within a 25 to 200° C. temperature range, where net force is an average force for the first 1 m of ribbon stack 112 withdrawn from the tube 114, after overcoming static frictional forces. Empirical testing suggests embodiments disclosed herein may have net pull-out forces in the range of 0.10 to 0.50 N per 30 m of cable per fiber for cables having 500-800 kN composite strengths.

A method of manufacturing the cable 110, 210, 310 includes steps of positioning the water-blocking tape 118 around a stack 112, 212, 312 of fiber optic ribbons and positioning a support 128, 228, 328 adjacent to the water-blocking tape 118 such that the tape 118 overlays the support 128, 228, 328 to form an elevated portion of either the support 128, 228, 328 or the water-blocking tape 118. The method further includes steps of twisting the stack 112, 212, 312 and extruding a tube 114 around the stack 112, 212, 312, the support 128, 228, 328, and the water-blocking tape 118, with the water-blocking tape 118 positioned at least partially around the stack 112, 212, 312 in the interior 116 of the tube 114, between the stack 112, 212, 312 and the tube 114. The support 128, 228, 328 raises the elevated portion 120, 220, 320 toward a lengthwise center of the interior 116 of the tube 114. Applicants believe all of these materials can be inserted, applied, and assembled with conventional equipment in the industry.

The construction and arrangements of the fiber optic cable, as shown in the various exemplary embodiments, are illustrative only. Although only a few embodiments have been described in detail in this disclosure, many modifications are possible (e.g., variations in sizes, dimensions, structures, shapes, and proportions of the various members, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. For example, for embodiments with the optical element being stranded buffer tubes, the water-blocking tape may be raised by overlapping edges of the water-blocking tape, with the elevated portion having the arc dimensions described above with regard to a round tube or jacket surrounding the stranded buffer tubes and central member. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present inventive technology.

What is claimed is:

1. A fiber optic cable, comprising:
   a tube having an interior;
   a stack of fiber optic ribbons extending through the interior of the tube, wherein the stack twists along a lengthwise axis of the tube;
   a first water-blocking tape positioned at least partially around the stack between the stack and the tube, in the interior of the tube;
   a second water-blocking tape that is an additional piece of tape that is separate from the first water-blocking tape, the second water-blocking tape positioned between the first water-blocking tape and the tube, in the interior of the tube, wherein the first water-blocking tape at least partially overlays the second water-blocking tape such that an elevated portion of the first water-blocking tape is raised toward a lengthwise center of the interior of the tube,
   wherein, as the stack twists along the lengthwise axis of the tube, at a first position along the length of the cable in which a first cross-sectional dimension of the stack is aligned with the elevated portion, the stack interfaces with the elevated portion to provide frictional coupling between the stack and the tube, and
   wherein, at another position along the length of the cable in which a second cross-sectional dimension of the stack is aligned with the elevated portion, the stack has less frictional coupling with the tube than at the first position.

2. The cable of claim 1, wherein the first cross-sectional dimension includes a corner of the stack, which, when aligned with the elevated portion, compresses the water-blocking tape and support against the interior of the tube, wherein the second cross-sectional dimension includes a side of the stack between corners, which, when aligned with the elevated portion, does not pin the water-blocking tape or support to the interior of the tube.

3. The cable of claim 1, wherein the second water-blocking tape is more rigid than the water-blocking tape.

4. The cable of claim 1, wherein the second water-blocking tape has less surface area than the first water-blocking tape, wherein the first water-blocking tape extends fully around the stack and the second water-blocking tape extends less than halfway around the stack.

* * * * *